United States Patent [19]

Soteropulos

[11] 4,444,098

[45] Apr. 24, 1984

[54] CYLINDRICAL BALER WITH SELF-CLEANING GATE

[75] Inventor: Gust S. Soteropulos, Ottumwa, Iowa

[73] Assignee: Deere & Company, Moline, Ill.

[21] Appl. No.: 382,885

[22] Filed: May 28, 1982

[51] Int. Cl.³ ............................................. B30B 5/06
[52] U.S. Cl. .................................... 100/88; 56/341
[58] Field of Search ................. 100/88, 89; 56/341, 56/343

[56] References Cited

U.S. PATENT DOCUMENTS

| | | | |
|---|---|---|---|
| 3,866,531 | 2/1975 | Todd et al. | 56/341 X |
| 3,910,178 | 10/1975 | Eggers et al. | 100/88 X |
| 4,150,527 | 4/1979 | Meiers | 56/341 |
| 4,182,101 | 1/1980 | Gaeddert et al. | 56/341 |
| 4,244,166 | 1/1981 | Hayward | 56/341 |
| 4,252,057 | 2/1981 | Gaeddert et al. | 100/88 |
| 4,273,036 | 6/1981 | Kopaska | 100/88 |
| 4,336,750 | 6/1982 | White et al. | 100/88 |

OTHER PUBLICATIONS

U.S. Patent Application Ser. No. 285,178 filed Jul. 20, 1981, entitled Staggered Rolls and Belts for Round Baler, Viaud–inventor.
U.S. Patent Application Ser. No. 382,886 filed simultaneously with the above–identified application entitled Cylindrical Baler With Substantially Enclosed Bale–Forming Chamber, Anstey et al.–inventors.
U.S. Patent Application Ser. No. 308,223 filed Oct. 5, 1981, entitled Belt Tensioning System for Round Balers, Koning et al.–inventors.

Primary Examiner—Peter Feldman

[57] ABSTRACT

A baler is comprised of a frame with a pair of opposed sidewalls, a plurality of side-by-side endless belts supported on a plurality of rollers and defining a bale forming chamber into which crop material is fed and rolled into a cylindrical bale. A bale discharge gate is constituted by rear sections of the sidewalls and by certain of the belt guide rollers extending therebetween. A span of the belts extends below the lower extremities of the rear sidewall sections and define openings through which crop material may be discharged from substantially enclosed volumes contiguous with the bale forming chamber.

10 Claims, 5 Drawing Figures

CYLINDRICAL BALER WITH SELF-CLEANING GATE

CROSS-REFERENCE TO RELATED APPLICATIONS

U.S. Patent application, Ser. No. 382,886, filed simultaneously herewith in the names of Anstey et al, entitled CYLINDRICAL BALER WITH SUBSTANTIALLY ENCLOSED BALE FORMING CHAMBER and assigned to the assignee of the invention herein is directed to a cylindrical baler having a plurality of side-by-side belts supported on a plurality of rollers. The belts define an expandable bale forming chamber for forming cylindrical bales. The belts are sized and spaced so as to enclose at least 80% of the distance between the sidewalls of the baler. The invention disclosed and claimed in application Ser. No. 382,886 is disclosed herein in Section II solely for the purpose of completeness of the description of the operative environment of the invention claimed herein and thus forms no part of the invention claimed herein.

U.S. Patent application, Ser. No. 382,882, filed simultaneously herewith in the name of Anstey entitled CYLINDRICAL BALER WITH SELF-CLEANING DRIVE ROLLER and assigned to the assignee of the invention herein, is directed to a cylindrical baler having a plurality of side-by-side belts supported on a plurality of rollers. The belts define an adjustable bale forming chamber. One of the rollers is comprised of a cylindrical core and a plurality of rubber sleeves spaced along the length of the core. Each sleeve underlies a respective one of the belts for aiding in the prevention of the wrapping of crop material around the roller. The invention disclosed and claimed in application Ser. No. 382,882 is disclosd herein in Section III solely for the purpose of completeness of the description of the operative environment of the invention claimed herein.

U.S. Patent application, Ser. No. 285,178 filed July 20, 1981, in the name of Viaud, entitled STAGGERED ROLLS AND BELTS FOR ROUND BALER, and assigned to the assignee of the invention herein is directed to a cylindrical or round baler having a plurality of belts supported on a plurality of rollers. The belts define an adjustable bale forming chamber. Certain of the belts and rolls are arranged in a staggered array to prevent crop buildup in volumes contiguous with the bale forming chamber. The invention disclosed and claimed in application Ser. No. 285,178 is disclosed herein in Section I solely for the purpose of completeness of description of the operative environment of the invention claimed herein and thus forms no part of the invention claimed herein. The disclosure of the application Ser. No. 285,178 is hereby incorporated by reference herein.

U.S. Patent application, Ser. No. 308,223, filed Oct. 5, 1981 in the name of Koning et al, entitled BELT-TENSIONING SYSTEM FOR ROUND BALERS and assigned to the assignee of the invention herein is directed to a cylindrical baler having a plurality of side-by-side belts supported on a plurality of rollers. The belts define the bale forming chamber. A belt tensioning and takeup mechanism is used to control the tension in the belts and the size of the bale forming chamber. The invention disclosed and claimed in application Ser. No. 308,223 is disclosed herein in Section I solely for the purpose of completeness of description of the operative environment of the invention claimed herein and thus forms no part of the invention claimed herein. The disclosure application Ser. No. 308,223 is hereby incorporated by reference herein.

U.S. Patent application, Ser. No. 382,883, filed simultaneously herewith in the name of Frimml, entitled CYLINDRICAL BALER WITH FLARE SHEETS ON CROP PICKUP and assigned to the assignee of the invention herein, is directed to a cylindrical baler with flare sheets and a crop pickup mounted underneath the baler frame. The invention disclosed and claimed in Ser. No. 382,883 is disclosed herein in Section I solely for the completeness of description of the operative environment of the invention claimed herein and thus forms no part of the invention claimed herein.

BACKGROUND OF THE INVENTION

This invention relates to a baler for producing cylindrical ("round") bales and more particularly relates to a bale discharge gate for such balers.

Prior art balers such as disclosed in U.S. Pat. Nos. 4,182,101, 4,252,057 and 4,150,527 comprise generally a plurality of side-by-side belts supported on a plurality of rollers. A bale forming chamber is defined by the sides of the baler, the rollers and the belts. One of the problems experienced with such balers is caused by crops becoming entrapped within volumes contiguous with the bale forming chamber and substantially enclosed by the sides of the baler, the rollers and the belts. The crop enters these volumes from the bale forming chamber by passing through the spaces between longitudinally adjacent belts. When the crop becomes entrapped within these volumes, it tends to wrap around the rolls which is detrimental to proper belt tracking on the rolls and tends to retard enlargement of the bale forming chamber as the bale grows in diameter. Eventually, if uncorrected, the belts become bound (or may even break) and bale formation is no longer possible until the wrapped and entrapped hay is removed.

Such problems have been found to be particularly troublesome when baling crops such as high moisture hay and extremely low moisture hay or straw.

SUMMARY OF THE INVENTION

Accordingly, it is an object of this invention to provide an improved baler which is less subject to plugging and wrapping of the belt guide rollers for a wide variety of crops and crop conditons.

Another object of this invention is to provide an improved baler which has particular utility for baling crops such as high moisture hay and extremely low moisture hay or straw.

Another object of the invention is to provide an improved baler which is less subject to the accummulation of crop material in volumes contiguous with the bale forming chamber and therefore require less cleaning and maintenance.

These and other objects of the invention which will be apparent from a consideration of the following detailed description are accomplished by a baler comprising a frame including a pair of parallel spaced sidewalls, a plurality of rollers extending between the sidewalls, a plurality of side-by-side belts supported on the rollers and defining an expandable bale forming chamber. A spaced pair of the rollers are mounted adjacent to a lower edge of the sidewalls. The rollers have a span of said belts extending between the rollers. In accordance with the invention herein, the improvement resides particularly in the fact that the belt span extends below a lower edge of the sidewalls. With a belt span so located, openings are provided through which crop material may fall out from substantially enclosed volumes contiguous with the bale forming chamber. In such volumes, crop material is usually automatically retained at a level at which roller wrapping and binding of the belts is not troublesome.

In accordance with a preferred embodiment of this invention, the belts and the sidewalls substantially enclose a large volume contiguous with the bale forming chamber.

In accordance with a further feature of a preferred embodiment of the invention, each of the sidewalls of the baler has a front and rear section. The rear sections constitute a bale discharge gate and are pivotally mounted relative to the front sections between a closed position for forming a bale forming chamber and an open position for discharging a bale. One of the rollers of the pair is mounted adjacent the front lower corner of the rear sidewall sections and, in part, defines one side of the entrance into the bale forming chamber.

DESCRIPTION OF THE PREFERRED EMBODIMENT

I. General

Figure 1:
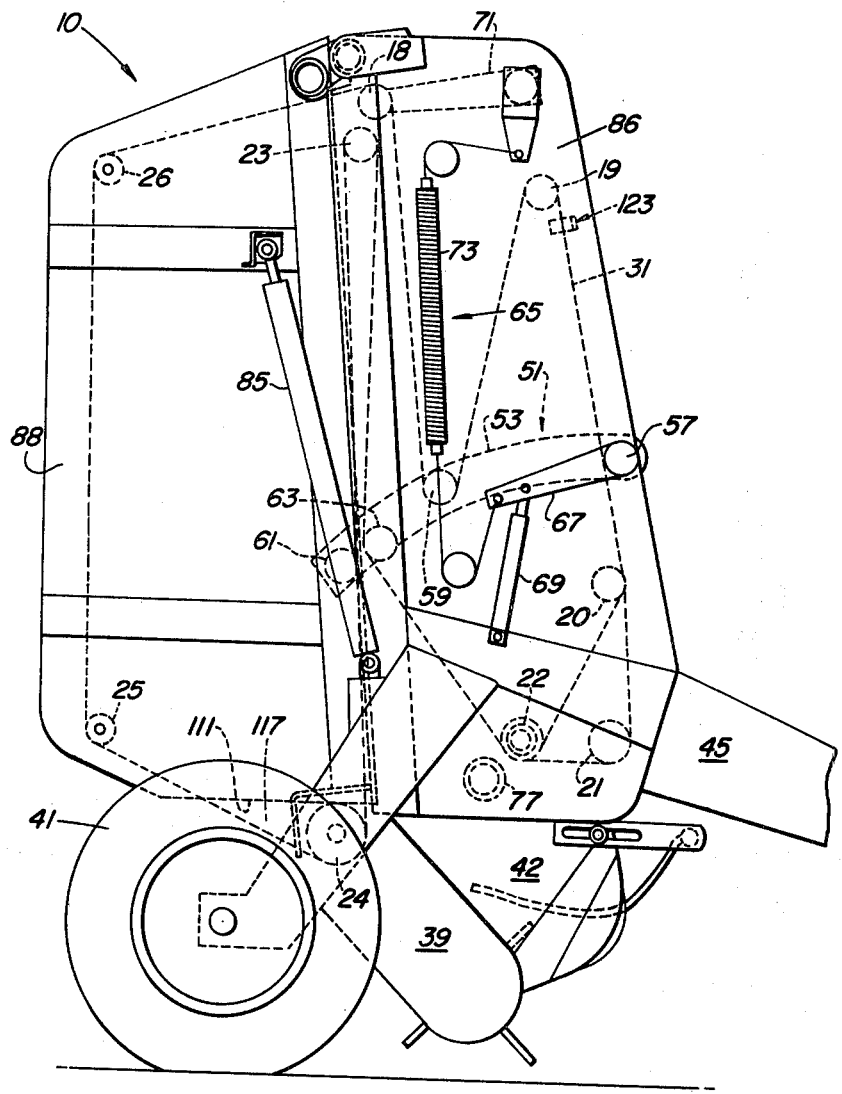
FIG. 1 is an elevational view of the right side of a baler in accordance with the features of this invention. Certain nonessential components (e.g. external shielding) are omitted for simplicity and clarity.

Reference is now made to FIGS. 1-4, which illustrate a preferred embodiment of a baler in accordance with features of this invention. The baler is generally comprised of a frame 10 with a pair of opposed sidewalls 13, 15; a plurality of rollers 18-26 rotatably mounted on and extending between sidewalls 13, 15; a plurality of endless, side-by-side belts 31-38 supported on guide rollers 18-26 and defining between sidewalls 13, 15 an expandable bale forming chamber 40 for forming cylindrical bales and a crop pickup 39 for feeding crop material from the ground into bale forming chamber 40. A pair of flare sheets 42 (only one shown) is mounted on the respective ends of pickup 39 and is the subject of the application Ser. No. 382,883 cross referenced above. The baler frame 10 is supported on wheels 41 (only one shown) and is drawn behind a tractor (not shown) via a draft tongue 45.

Belts 31-38 include a pair of generally upwardly oriented, opposed spans or segments 47, 49 which form chamber 40 and extend between roller 61 and roller 24 and between roller 63 and roller 22, respectively. As shown in FIG. 2 the size of chamber 40 and the length of spans or segments 47, 49 are adjustable to accommodate the increasing diameter of a bale 50 during formation by a belt take-up and tensioning mechanism 51. Belt take-up and tensioning mechanism 51 is fully disclosed in U.S. Patent application Ser. No. 308,223, cross referenced above, forms no part of the invention herein and will only be briefly described herein for convenience. Mechanism 51 includes a pair of arms 53, 55 pivotally mounted on a support 57, a take up and tensioning roller 59 supported between arms 53, 55 and a pair of chamber restricting rollers 61, 63 supported between arms 53, 55. Take-up and tensioning mechanism 51 is biased in a counterclockwise direction (FIG. 2) by a pair of bias mechanisms 65 on each side of the baler (only one shown in FIG. 1) including bias arm 67 fixed to one end of support 57, hydraulic cylinder 69, bell crank 71 and spring 73 interconnected between crank 71 and bias arm 67.

As shown in FIG. 2 crop material is fed into bale forming chamber 40 through an open or unrestricted entrance 75 without substantial compaction by pickup 39. Entrance 75 is defined by the lowermost opposed belt guide rollers 24, 22, crop pickup 39 and a stripper roller 77. Stripper roller 77 aids in initiation of a bale core, partially supports the weight of the bale during formation and strips hay from belt segment 49 to prevent the loss of crop material from chamber 40.

Figure 4:
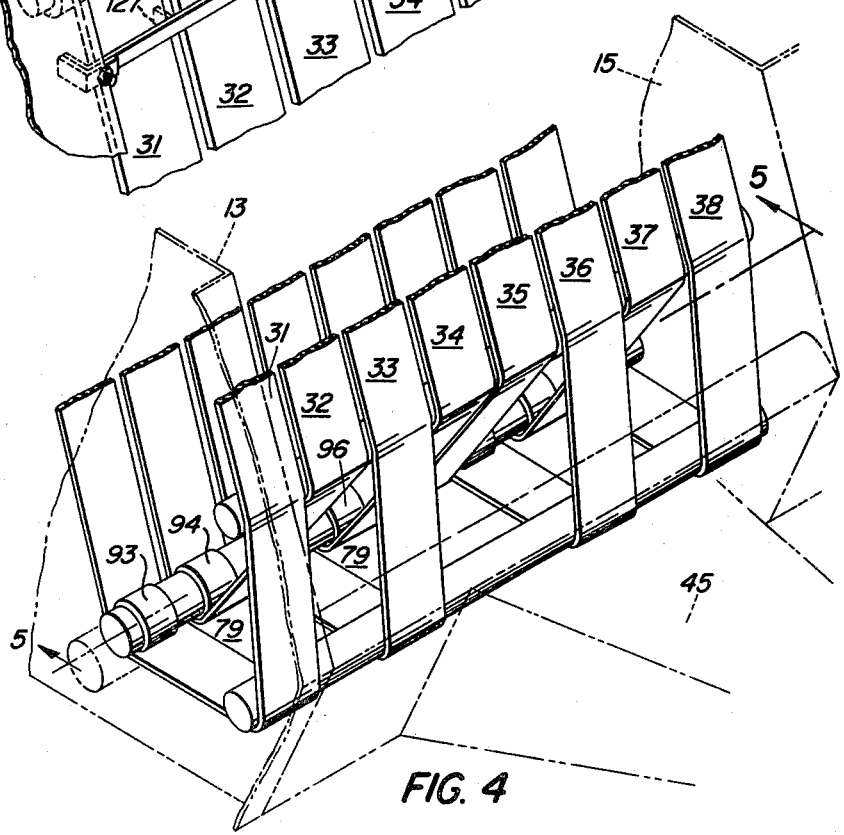
FIG. 4 is a fragmentary perspective view of a lower front portion of the baler of FIG. 1.

Belts 31-38 are driven in the direction of arrows 72, 74 by driving drive rollers 19, 22 through a conventional driven train (not shown) connected to the power take-off shaft of the tractor (not shown) used to pull the baler. As shown in FIGS. 2 and 4 herein and as described in U.S. Patent application Ser. No. 285,178, cross referenced above and incorporated by reference herein, belts 31-38 are arranged in a staggered manner on guide rollers 24, 25 to form opening or spaces 79 through which crop material may escape before causing roll wrapping or buildup of trapped crop material within volumes such as volume 81 contiguous with bale forming chamber 40. The staggered belt and roller feature forms no part of the invention herein and has therefore been only briefly described.

Referring again to FIG. 1 each side sheet 13, 15 is comprised of front sections 86, 87 and rear sections 88, 89 respectively. Rear sections 88, 89 and rollers 24-26 constitute a bale discharge gate 82. Gate 82 is pivotally movable relative to front sections 86, 87 about a pivot 83 by actuation of a pair of hydraulic cylinders 85 (only one shown) for ejection of bale 50 (when completed) from chamber 40.

A belt guide member 123 (FIGS. 1 and 3) is fixed between sidewalls 13, 15 and comprises a plurality of guide bars which are positioned respectively between adjacent ones of belts 31-38 to aid in maintaining proper belt alignment and tracking on guide rollers 18-26.

In operation, a bale is formed in the baler by pulling the baler through a field with a tractor. Crop material is picked up from a windrow on the ground by the crop pickup 39 and is fed upwardly without substantial compaction through open entrance 75 into chamber 40. The crop material is engaged with upwardly moving belt segment 47 and begins to turn in a clockwise direction (FIG. 2) where it is engaged by downwardly moving belt segment 49. When the crop material reaches the lowermost portion of belt segment 49, it is engaged by stripper roller 77 rotating in a counterclockwise. Roller 77 tends to continue the rotation of crop material in a clockwise direction and into engagement with additional crop material being fed into chamber 40 through opening 75 thereby initiating the formation of a bale core. As the bale core increases in diameter, it becomes compacted by the tension in the belts until the tension in the belts imposed by belt tensioning and takeup mechanism 51 and bias means 65 is exceeded and arms 53, 55 along with rollers 59, 61, 63 are pushed in a clockwise direction. With the upward movement of rollers 59, 61, 63, belt segments 47, 49 are lengthened, thereby increasing the diameter of chamber 40. The size of the bale forming chamber 40 continued to increase as the diameter of the bale 50 increases and overcomes the tension imposed on the belts by springs 73 and cylinders 69. The tension on the belts is also adjustable to control bale density by the exchange of fluid between the upper and lower end of cylinders 69 via an adjustable relief valve (not shown). When bale 50 reaches a predetermined diameter, cylinders 85 are actuated to open bale discharge gate 82 to drop bale 50 on the ground.

II. Bale Forming Chamber

In accordance with the features of the invention herein, bale forming chamber 40 has sides which are substantially enclosed by belts 31–38. Belts 31–38 are sized and spaced to enclose at least 80%, and preferably over 90%, of the space between sidewalls 13, 15. The spacing of the belts is such that only sufficient room remains for the location of narrow bar-shaped belt guides 127–133 to be positioned between adjacent belts. The guides aid in maintaining proper belt tracking and alignment of the belts on the rollers. By substantially enclosing the chamber with the belts, it is believed that (1) less crop material escapes from the chamber to become entrapped and possibly plug volumes contiguous with the chamber and (2) smaller segments of the guide rollers are exposed to crop material thereby reducing the potential for wrapping of the material on the rollers.

For example, in a preferred embodiment of a baler in accordance with the invention, the spacing between the sidewalls 13, 15 is 117 cm. Six belts which are 17.8 cm in width, (7 inches) are spaced between sidewalls 13, 15. Belts 31, 38 are spaced inwardly from sidewalls 13, 15, respectively, a distance of 2.0 cm and each belt is spaced a distance of about 1.28 cm from the immediately adjacent belt on each side. Each belt guide bar 127–133 is 0.5 cm in thickness. With belts of this size and spacing, about 91% of the distance between sidewall 13, 15 is enclosed.

In accordance with another preferred embodiment, the following dimensions are used: Sidewall spacing—156.5 cm; number and size of belts—8 belts each 17.8 cm in width; spacing of sidewalls 13, 15 from immediately adjacent belts 31, 38—2.0 cm; spacing of each belt from immediately adjacent belt—1.45 cm; belt guide bar thickness—0.5 cm; and percentage of sidewall spacing enclosed by belts about—91%.

In the disclosed baler, it has been found that the substantial enclosure of the bale forming chamber has led to an improved ability to bale a wide variety of crops (for example, at any field moisture conditions and under a wide variety of other crop conditions with a reduced tendency for plugging or binding of the bale forming chamber and wrapping of the guide rollers 18–26 with crop material. In particular, the baler is able to bale hay with a moisture content from 10% up to 70 and 80%. Standing hay has a moisture content between 70 and 80%, thus the baler is useable to bale hay immediately after cutting. This has been found to be useful, for example in England, where it is sometimes the practice to bale hay (e.g. rye, grass) immediately after cutting and to place the bale in a plastic enclosure to produce ensilage. With prior art balers, the baling of hay at moisture levels between 25 and 50% are generally considered to be troublesome. The baling of low moisture hay and straw with prior art balers is also recognized as being extremely difficult because the crop tends to break into small pieces and to collect in volumes adjacent to the bale forming chamber. The baler disclosed herein is able to bale such material with a significantly reduced tendency for plugging.

III. Self-Cleaning Drive Roller

Figure 5:
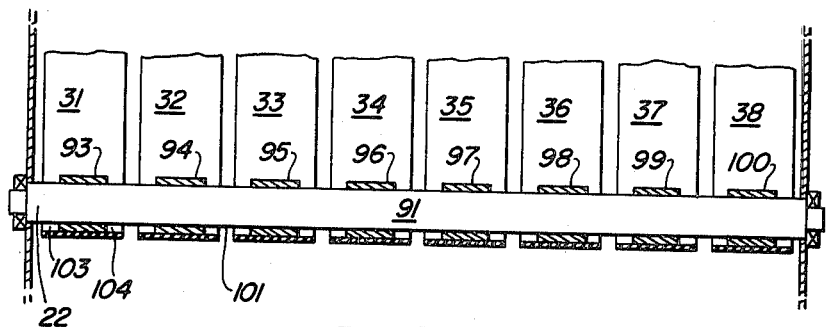
FIG. 5 is a longitudinal, fragmentary, cross-sectional view taken along lines 5—5 of FIG. 4 and illustrating the drive roller of the baler.
Figure 3:
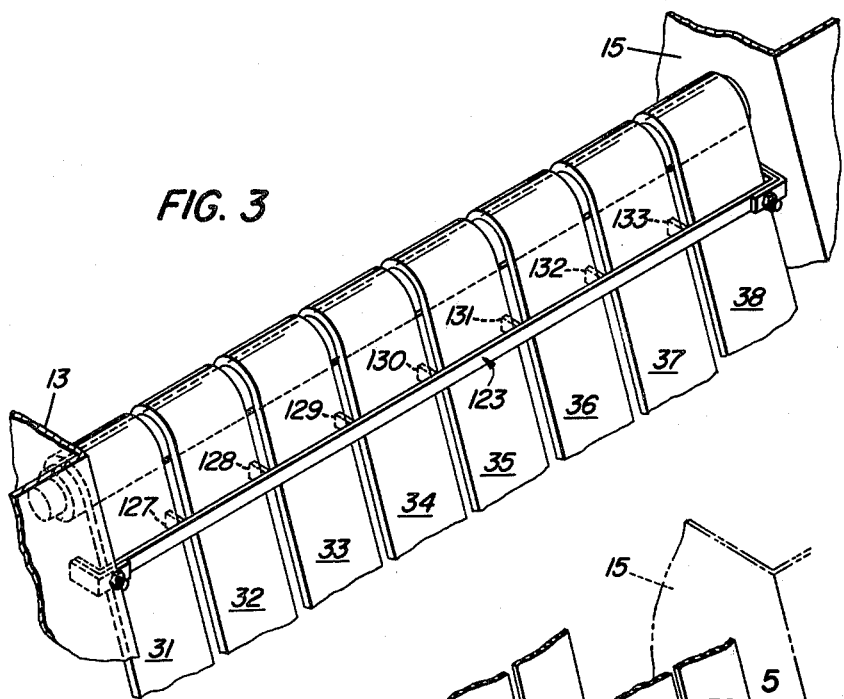
FIG. 3 is a fragmentary perspective view of an upper front portion of the baler of FIG. 1.

Reference is now made to FIGS. 2, 4 and 5 (particularly FIGS. 4 and 5) which illustrate a preferred embodiment of a baler with a self-cleaning drive roller 22 in accordance with the features of an invention disclosed and claimed in U.S. Patent application, Ser. No. 382,882, cross referenced above.

Drive roller 22 is comprised of a cylindrical core 91 (e.g., steel) and means for supporting the longitudinal edges of belts 31–38 out of contact with the surface 101 of core 91. The supporting means is here shown as being constituted by a plurality of rubber sleeves 93–100 bonded to the exterior surface 101 of the core 91.

It will be recognized that the supporting means may be constituted by any type of elevated surface for supporting the central portion (or portions thereof) of each belt such that the belt edges are normally out of contact with the core. For example, the core could be cast with a plurality of spaced elevated surfaces. The elevated surface under each belt may be continuous or discontinuous.

Each sleeve 93–100 is positioned on roller core 91 so as to lie beneath a respective one of belts 31–38. The width of the belts 31–38 and the width of the underlying sleeves 93–100 are chosen such that each belt extends beyond the sleeve lying thereunder and thereby forms a pair of gaps 103, 105, bounded by the exterior surface 101 of core 91, the inner surface of the belt and the outer edge of the sleeve. By way of example in a preferred embodiment, the belts are 17.8 cm in width and the sleeves are 12.7 cm. in width leaving a gap of about 2.5 cm in length. The thickness of the sleeve is 0.32 cm, providing a gap of less than 0.32 cm in height (between core surface 101 and the inner surface of a belt) because the cantilevered portion of the belts tends to bend toward core surface 101. The thickness of sleeves 93–100 should be sufficient to provide and maintain a gap. The thickness will vary for different belt materials.

It has been found that with a sleeve underlying each belt on roller 22, there is a significantly reduced tendency for crop material to wrap around roller 24. Without the sleeve the bale (at least during a portion of the bale formation cycle) rests on roll 22 and squeezes the span 49 against roller 22 so that crop material passing between belts 31–38 from chamber 40 can become wedged into the pinch point between segment 49 and roller 22. By the formation of gaps such as gaps 103, 105 adjacent the edge of each belt as it passes around roller 22, the formation of a pinch point is avoided to a great extent and there is a significant reduction in the tendency of crop material to become wedged and become bound under the edge of the belts. Although some crop material still passes between adjacent belts 31–38, it may fall through spaces 79 formed by the staggered arrangement of the belts 31–38 on rollers 21, 22. In addition, since there is a much reduced tendency of the ends of crop material to become bound under the edges of the belts, the hay has a greater tendency not to be pulled or peeled from the bale being formed in the chamber, thereby reducing crop loss. Furthermore, this feature significantly contributes to the trouble-free baler operation by reducing the tendency of crop material to become entwined around roller 22 which can lead to belt breakage and poor belt tracking for a wide variety of crops and crop conditions. This is particularly advantageous for the baling of a crop such as high-moisture hay and extremely low moisture hay or straw where there is a significant tendency of the crop to wrap around the belt guide rollers and eventually bind and plug the belts. It will be recognized that belt guide rollers (e.g., roller 61), other than roller 22, which have a tendency to wrap with crop material may be provided with means for supporting the belt edges. This tendency has been primarily identified with rollers which engage the belts at locations in contact with the bale during formation.

IV. Self-cleaning Gate

Figure 2:
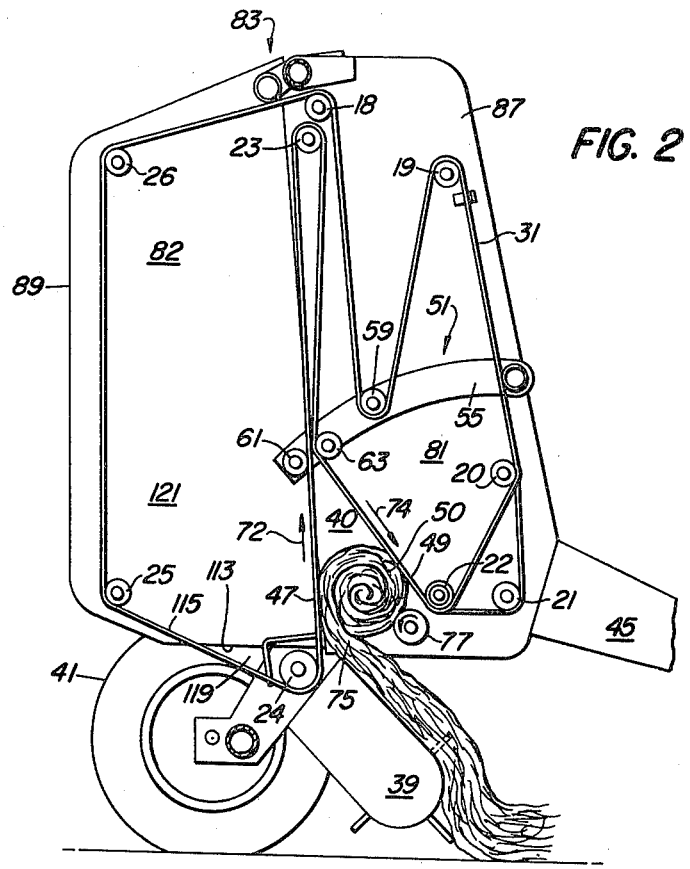
FIG. 2 is an elevational view of the right side of the baler of FIG. 1 with the right sidewall removed to expose the internal components and with a partially formed bale in the bale forming chamber.

Reference is now made to FIGS. 1 and 2 which illustrate a preferred embodiment of a baler with a self-cleaning gate as disclosed and claimed in U.S. Patent application Ser. No. 382,885 cross referenced above.

Gate 82 is comprised of rear sidewall sections 88, 89 and guide rollers 24–26 supported therebetween. Gate 82 is pivotally mounted above pivot 83 for rearward movement away from sidewall sections 86, 87 and the rollers supported therebetween to permit the discharge of a bale. Rollers 24, 25 are mounted adjacent lower edges 111, 113. A segment 115 of belts 31–38 extending between rollers 24, 25 extends below portions of lower edges 111, 113 to provide a pair of openings 117, 119 on each side of the baler. Opening 117, 119 lead into a volume 121 defined by the belt spans extending around rollers 23–26 and rear sidewalls 88, 89. Openings 117, 119 allow crop material to fall out and not accumulate in volume 121. Crop material in the bale forming operation enters region 121 from chamber 40 by passing between adjacent belts 31–38 and, if left to accumulate, can lead to wrapping and binding of the belt guide rollers and sometimes belt breakage.

The use of gate openings 119, 117 has particular utility when the bale forming chamber is substantially enclosed by belts 31–38 as disclosed in Section II above. In this instance, when crop material begins to accumulate on belt segment 115, there is a greater tendency for the crop to become entrapped and not fall between adjacent belts onto the ground because of the close spacing of the belts. This feature further contributes to the operation of the baler for a wide variety of crops and crop conditions and in particular for baling a crop such as high-moisture hay and extremely low moisture hay or straw. It has been found that under most circumstances, crop material will fall through openings 117, 119 automatically during the baling operation thereby retaining the amount of crop material accumulated in volume 121 to a level which does not degrade functional performance of the baler.

The invention herein has been described in connection with certain preferred embodiments thereof. Other modifications and embodiments of the invention will be apparent to those skilled in the art. Accordingly, it is intended that the appended claims cover all such modifications and embodiments as are within the true spirit and scope of the invention.

I claim:

1. In a baler for forming cylindrical bales, said baler comprising:
    a frame including a pair of parallel spaced sidewalls;
    a plurality of rollers mounted on and extending between said sidewalls, a spaced pair of said rollers mounted adjacent a lower edge of said sidewalls;
    a plurality of side-by-side, longitudinally extending, bale engaging belts supported on said rollers, transversely spaced between said sidewalls and defining a bale forming chamber with a throat through which crop material is fed, said belts having a belt span extending between said pair of said rollers and extending below said lower edge;
    said sidewalls, said belts and said rollers defining a volume contiguous with said bale forming chamber; and
    one of said pair of rollers defining the lowermost portion of said volume, the improvement comprising:
    said belt span defining a pair of openings in said volume adjacent to said one roller for permitting crop material accumulated in said volume to escape.

2. The baler of claim 1 wherein said belts substantially enclose the space beween said sidewalls.

3. The baler of claim 1 wherein said belts enclose in excess of about 90% of the space between said side sheets.

4. The baler of claims 1, 2 or 3 wherein:
    each of said sidewall has a front section and a rear section;
    said rear sections are pivotably mounted relative to said front sections;
    said rear sections and certain of said plurality of rolls define a rear gate movable between a closed position for forming a bale in said chamber and an open position for discharging a bale from said chamber; and
    said one roller is mounted adjacent the front lower corner of said rear sidewall sections.

5. The baler of claim 4 wherein:
    said chamber, when in an empty condition, is defined by a front and a rear belt span extending generally upwardly and defining said throat at the lower extremities of said front and rear belt spans; and
    said one roller of said pair defines the lower extremity of said rear belt span.

6. The baler of claim 5 wherein the other of said pair of rollers is mounted adjacent the lower rear corner of said rear sidewall sections.

7. In a baler comprising:
    a frame including a pair of opposed front sidewall sections and a pair of opposed rear sidewall sections, said rear sections pivotably mounted relative to said front sections between a closed and an open position;
    a plurality of rollers extending between said front sections and between said rear sections, said pair of rear sections and the rollers of said plurality extending therebetween constituting a bale discharge gate;
    a plurality of side-by-side, longitudinally extending, bale engaging belts supported on said plurality of rollers and transversely spaced between said sidewalls;
    said belts, said plurality of rollers, and said pairs of front and rear sidewall sections defining an adjustable bale forming chamber; and said belts, rear sections and rollers extending therebetween defining a volume contiguous with said bale forming chamber, the improvement comprising a span of said belts extending below a lower extremity of said rear sections and defining an opening into the lowermost portion of said volume for permitting crop material accumulated in said volume to escape.

8. The baler of claim 7 wherein said belts substantially enclose the space between said sidewalls.

9. The baler of claim 8 wherein said belts enclose in excess of about 90% of the space between said sidewalls.

10. The baler of claim 9 wherein a pair of said plurality of rolls are mounted adjacent the lower extremity of said rear sidewall sections and said belt span extends between said pair of rollers, one of said pair of rolls is mounted adjacent to the front lower corner of said rear sidewall sections;

said chamber, when in an empty condition, is defined by a front and rear belt span extending generally upwardly and defining an entrance into said chamber at the lower extremities of said pair of chamber defining belt spans, and said one roll of said pair defining the lower extremity of said rear, chamber defining belt span.

* * * * *